March 8, 1927.
A. L. LAMBERT
VEHICLE DOOR CONSTRUCTION
Filed Sept. 19, 1923
1,620,615
2 Sheets-Sheet 1
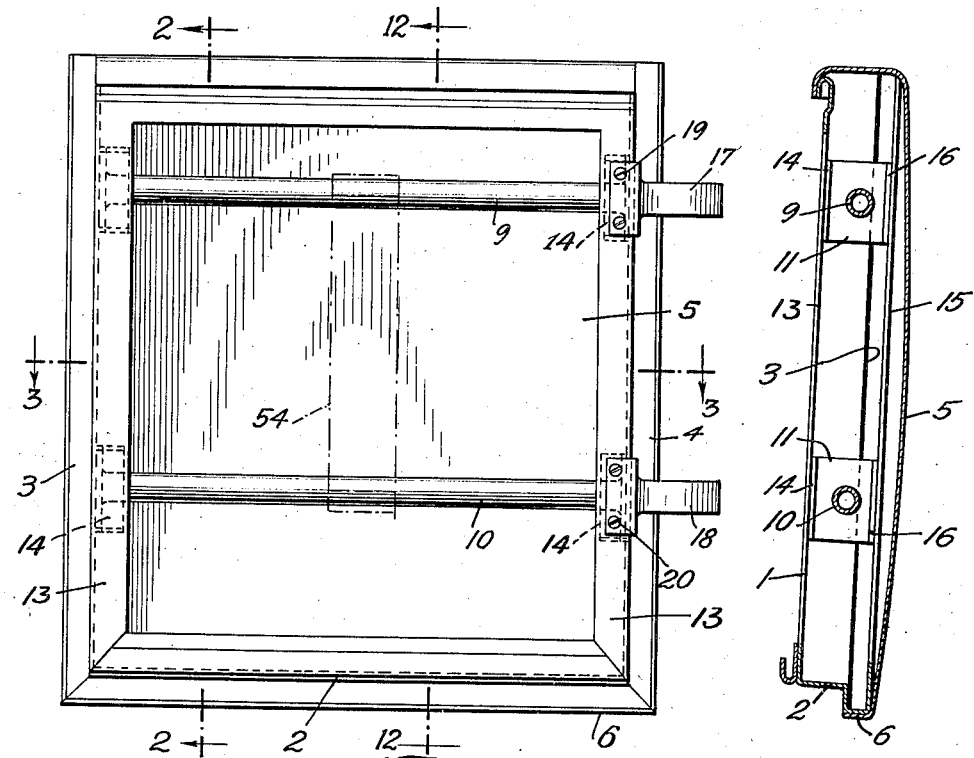
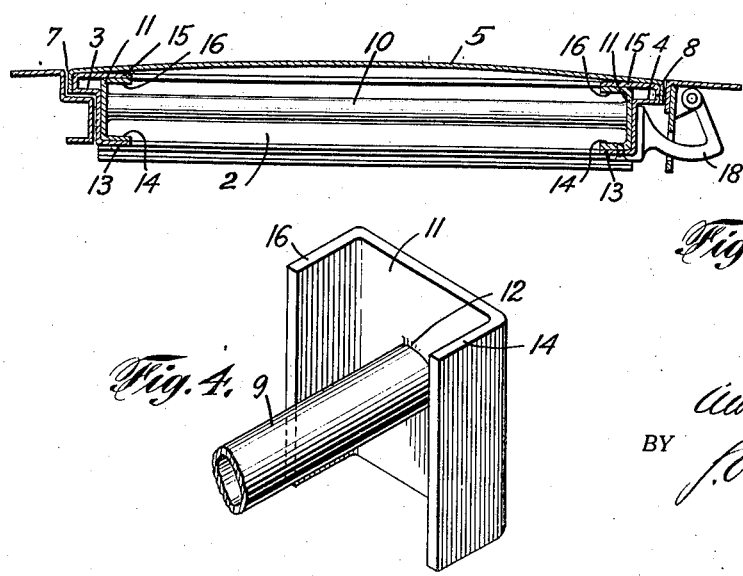
INVENTOR
Albert L. Lambert
BY
ATTORNEY March 8, 1927.
A. L. LAMBERT
1,620,615
VEHICLE DOOR CONSTRUCTION
Filed Sept. 19, 1923
2 Sheets-Sheet 2
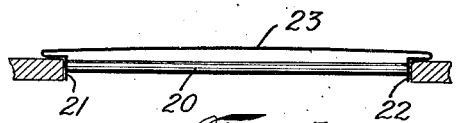
Fig. 5.
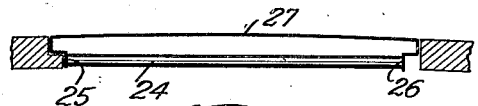
Fig. 6.
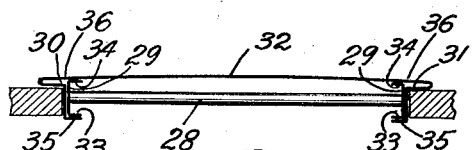
Fig. 7.
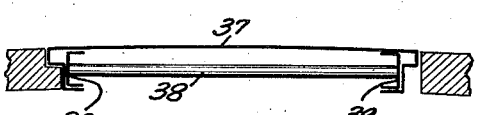
Fig. 8.
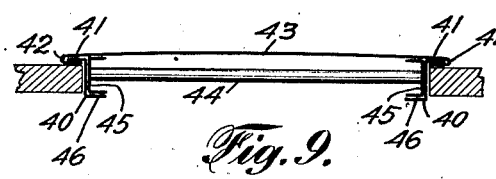
Fig. 9.
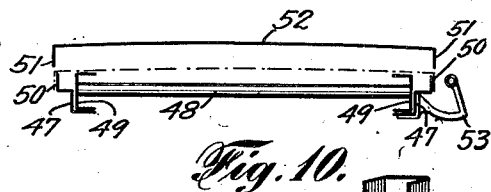
Fig. 10.
Fig. 11.
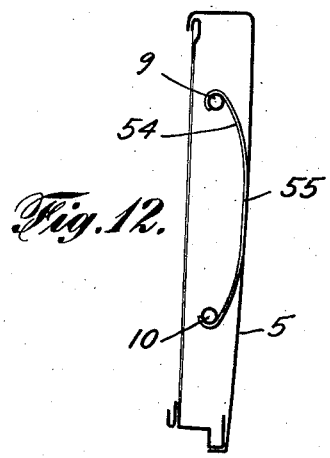
Fig. 12.
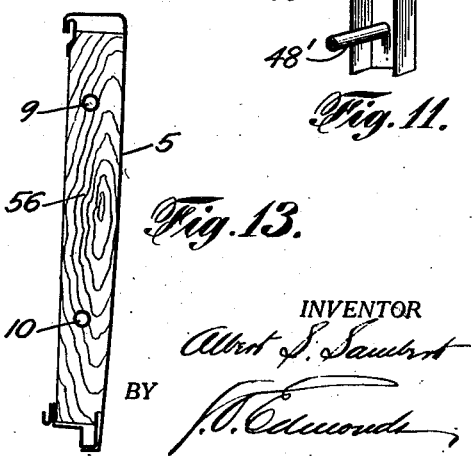
Fig. 13.
INVENTOR
Albert L. Lambert
BY
ATTORNEY Patented Mar. 8, 1927.

1,620,615

UNITED STATES PATENT OFFICE.

ALBERT L. LAMBERT, OF NARBERTH, PENNSYLVANIA, ASSIGNOR TO HEINTZ MANUFACTURING COMPANY, OF PHILADELPHIA, PENNSYLVANIA, A CORPORATION OF PENNSYLVANIA.

VEHICLE DOOR CONSTRUCTION.

Application filed September 19, 1923. Serial No. 663,524.

This invention relates to doors for vehicle bodies, such as automobile bodies, and is especially applicable to sheet metal doors.

The principal object of my invention is to provide a vehicle door which is extremely sturdy and durable, inexpensive and simple in construction, and attractive in appearance.

Another object of my invention is to provide a vehicle door construction which permits the door frame to be made complete, and with or without hinges, before the outer panel is applied.

A further object of my invention is to provide a vehicle door construction having increased stiffness, wherein the stresses are removed from the corners of the door, and providing increased reenforcement for the hinges.

Other objects of my invention will be in part obvious and in part pointed out hereinafter.

In accordance with my invention, I extend one or more tubular members across the door, preferably in the interior thereof, and secure the ends of the tubular members, either directly or indirectly, to the opposite edge portions of the door structure. Such tubular members have great torsional moment per unit of weight, and, therefore, render the structure exceedingly strong and rigid in proportion to the weight thereof. The structure is greatly reenforced and braced by these tubular members, preventing the door rails from drawing out of parallel, and removing the stresses from the corners of the door. Such tubular members may also be utilized to reenforce the hinges, making the mounting much stronger, and so brace the door frame as to permit the door frame to be constructed complete, including hinges, if desired, before the outer door panel is applied thereto.

In order that a clearer understanding of my invention may be had, attention is hereby directed to the accompanying drawings, forming a part of this application and illustrating certain possible embodiments of my invention.

Referring to the drawings:—

Fig. 1 is a rear view of a door embodying my invention;

Fig. 2 is a vertical sectional view thereof, and is taken on the line 2—2 of Fig. 1;

Fig. 3 is a horizontal sectional view thereof, and is taken on the line 3—3 of Fig. 1;

Fig. 4 is a perspective view of a portion of a tubular reenforcing member with an end plate attached thereto;

Fig. 5 is a sectional view of a modified construction, wherein the end plates are omitted, the door being of the overlapping type;

Fig. 6 is similar to Fig. 5, except the door is of the flush type;

Fig. 7 is a sectional view of a modified construction of a door of the overlapping type including the end plates;

Fig. 8 is similar to Fig. 7, but shows a door of the flush type;

Fig. 9 is a sectional view of an overlapping type door of another modification;

Fig. 10 is a sectional view of a reenforced door frame for a flush type door, showing the outer panel of the door separated from the frame;

Fig. 11 is a perspective view of fragments of two spaced tubular reenforcing members secured to a single end plate;

Fig. 12 is a vertical sectional view of a door embodying my invention, taken on the line 12—12 of Fig. 1; and Fig. 13 is a view similar to Fig. 12, showing modified means for preventing the outer door panel from drumming.

Similar reference characters refer to similar parts throughout the several views of the drawings.

Referring to the drawings, the door construction as shown in Figs. 1 to 3, inclusive, and which is of the flush type, includes a sheet metal member 1, forming the bottom edge 2 and the opposed side edges 3 and 4 of the door. Covering the front of this frame member 1 is an outer door panel member 5, which has a bottom flange 6 overlapping and secured to the bottom edge 2 of member 1, and having side flanges 7 and 8 respectively overlapping and secured to the opposed edge members 3 and 4 of the member 1. Extending between the edge members 3 and 4 within the door are a pair of spaced hollow tubular members 9 and 10, these members being preferably metallic. To each end of the members 9 and 10 is secured a channel-shaped end plate, such as 11, the ends of the members 9 and 10 preferably being welded to these end plates, as at 12. Each end plate 11 is rigidly connected with an edge member, such as 3 or 4, preferably being welded thereto. Each end plate 11 is preferably channel-shaped, and the edge members 3 and 4 are preferably provided with inner flanges, such as 13, abutting and welded to one side wall 14 of the channel end plates 11, and have front flanges 15 abutting and secured to the opposite side walls 16 of the channel end plates 11. Hinges, such as 17 and 18, of the ordinary type used for automobile doors may be attached to the door where the end plates 11 are associated therewith, as at 19 and 20.

It will be apparent from the above that the tubular members 9 and 10 act as reenforcing and stiffening means, rendering the structure exceedingly strong and rigid in proportion to the weight thereof on account of the great torsional moment of the tubular members per unit of weight. It will also be apparent that the tubular members with the end plates provide reenforcement for the hinges, which reenforcements extend completely across the door, making the hinge mounting extremely strong and durable. In such construction, the two vertical edge members or door rails are prevented from becoming out of parallel, and stresses are removed from the corners of the door.

One important feature of my invention is to provide a door reenforced by means of tubular members extending within the door between opposite sides thereof, and such tubular members may be incorporated in door constructions of various types and in various manners without departing from the scope of my invention.

As shown in Fig. 5, the ends of one or more tubular members, such as 20, may be rigidly connected, as by welding, directly to the two opposed edge members 21 and 22 of a panel member 23 of a door of the overlapping type.

As shown in Fig. 6, one or more tubular reenforcing members 24 may be rigidly connected, as by welding, to two opposed edge members 25 and 26 of a panel 27 of a door of the flush type.

As shown in Fig. 7, one or more tubular reenforcing members 28, having end plates 29 rigidly connected preferably by welding, to each end, may be rigidly connected to two opposed side edges 30 and 31 of a door panel 32 of the overlapping type. In this construction, the end plates 29 are preferably channel-shaped, having their opposite side walls 33 and 34 rigidly connected, as by welding, respectively to inner flanges 35 and an outer panel portion 36 of the panel 32.

Fig. 8 shows a similar construction applied in a door of the flush type, the panel member being designated 37, the tubular member 38, and the end plates 39.

In Fig. 9 there is illustrated a door frame member 40, which is Z-shaped in cross-section. The outer flange 41 of this frame member is received within the folded edge 42 of the outer panel 43, forming a door of the overlapping type. Extending between two opposed edge members of the frame 40 are disposed one or more tubular reenforcing members 44, having channel-shaped end plates 45 rigidly connected, as by welding, to the opposed edge members and also to their inner flanges 46 and to the outer panel 43.

In Fig. 10 the door frame 47 is of step formation, with one or more tubular reenforcing members 48 extending between two opposed edge members thereof and secured, as by welding, to channel-shaped end plates 49, which are in turn rigidly connected, as by welding, with said opposed edge members. Frame member 47 has vertically extending flanges 50 adapted to be overlapped by the edge flanges 51 of an outer panel member 52. This permits the frame 47 with the reenforcing members 48 and end plates 49 to be assembled complete before the outer panel 52 is applied thereto. When panel 52 is applied, the parts may be secured together by welding the flanges 50 and 51 together. This forms a door of the flush type. If desired, hinges, such as 53, may be applied to the door frame before the panel 52 is applied thereto.

In the embodiment shown in Figs. 9 and 10, it is preferable to extend the end plates, such as 49, from the top to the bottom of the door, and if a plurality of tubular members, such as 48 and 48', are used, to secure both members to the same end plates.

In order to prevent the outer panel member, such as 5, from drumming, one or more sheet metal strips, such as 54, may be extended between the two tubular reenforcing members 9 and 10, where the strip may be secured, as by welding, the strip also abutting the inside of the panel 5, as at 55, and also being welded thereto. As another means of preventing the outer panel 5 from drumming, one or more wooden strips, such as 56, may be supported by the tubular members 9 and 10 tightly against panel 5.

As many changes could be made in the above construction and many apparently widely different embodiments of this invention coud be made without departing from the scope thereof, it is intended that all matter contained in the above description or shown in the accompanying drawings shall be interpreted as illustrative and not in a limiting sense.

What I claim is:—

1. In vehicle door construction, the combination with two opposed edge members, of a tubular member extending between said edge members, end plates rigidly secured to said tubular member, one at each end thereof, and each plate being rigidly secured to one of said opposed edge members, and a hinge secured to one of said edge members and to one of said end plates adjacent an end of said tubular member, whereby said end plate and tubular member reenforce the door at the hinge.

2. In vehicle door construction, the combination with an outer panel and two opposed edge members, of a tubular member extending between and rigidly connected with said edge members, and a member secured to said tubular member and to the rear side of said outer panel, whereby said outer panel is prevented from drumming.

3. In vehicle door construction, the combination with an outer panel and two opposed edge members, of a plurality of spaced tubular members extending between and rigidly connected with said edge members, and a member abutting said outer panel on the rear and supported by said tubular members, whereby said outer panel is prevented from drumming.

4. In vehicle door construction, in combination, a frame member, including two opposed edge members, a tubular member extending between said edge members, end plates rigidly secured to said tubular member, one at each end thereof, said end plates being rigidly connected respectively with each of said opposed edge members, and an outer panel adapted to be secured to said frame member and to both of said end plates after said tubular member and end plates have been connected with said edge members.

This specification signed this 17th day of September, 1923.

ALBERT L. LAMBERT.